United States Patent Office 2,823,027
Patented Feb. 11, 1958

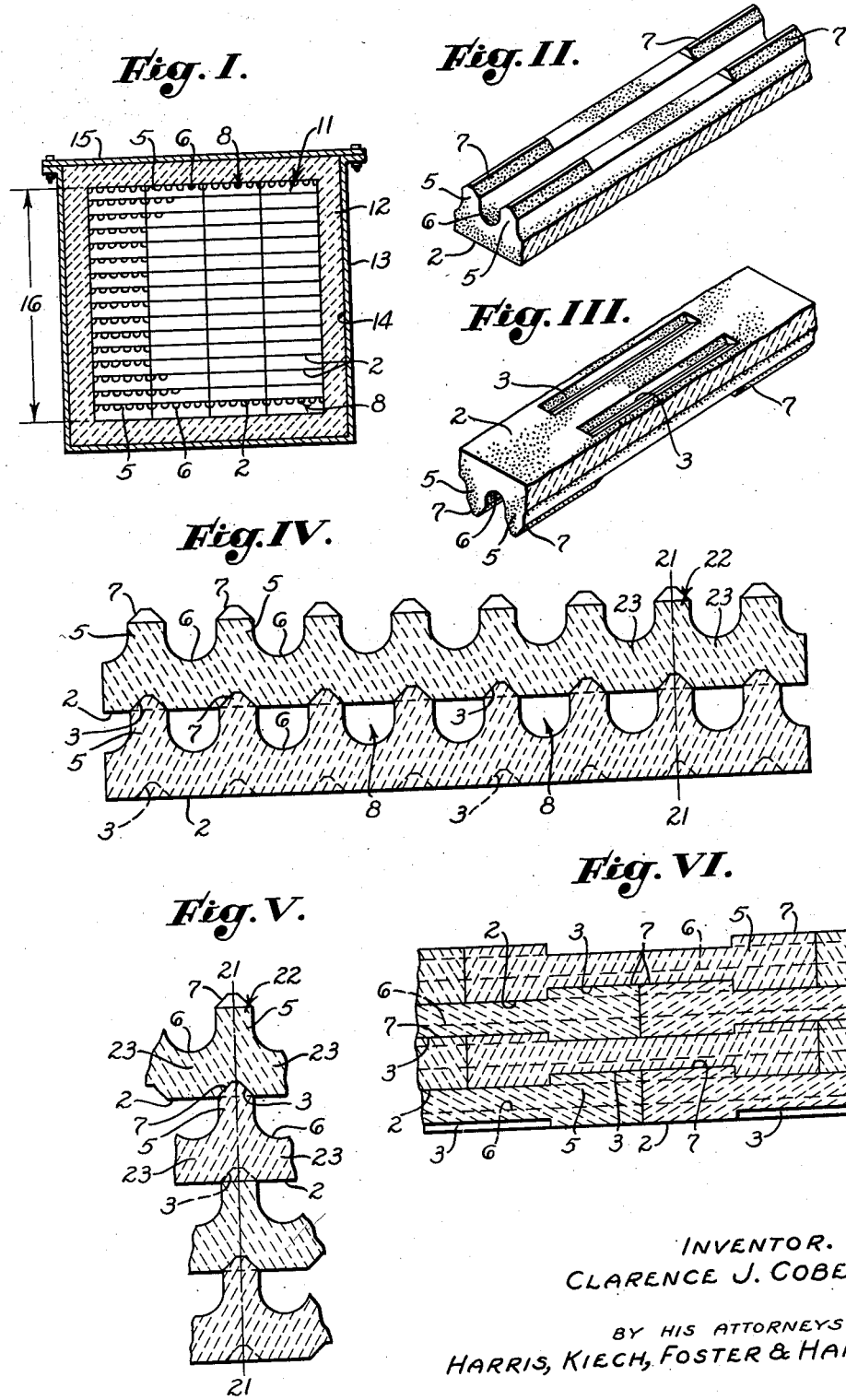

2,823,027

CERAMIC CHECKER MASS

Clarence J. Coberly, San Marino, Calif., assignor to Wulff Process Company, Huntington Park, Calif., a corporation of California Application November 21, 1955, Serial No. 547,955

6 Claims. (Cl. 263—51)

The invention may be briefly summarized as a new and useful ceramic tile, a new and useful ceramic heat regenerative mass, and a new and useful method of assembling said tile to form such a mass.

Such regenerative masses are used to store heat transferred from a heated gas passed through channels in such mass during one step of a cyclic process and to give up said heat during a later step in said process to a cooler gas which is passed through said channels.

The shape of such ceramic tile must be such as to give freedom from spalling and cracking, which requires that the section of the tile must be nearly uniform in section thickness. Any large or sudden change in thickness will not be satisfactory. Also, the shape of the passage through the assembled tile must be uniform and must give high heat transfer with low friction loss. The hydraulic radius of the passage should be between .02 and .15 inch. The ratio of cross-section of the ceramic tile to cross-section of the passage should be between 2 and 5.

An object of the invention is to form a ceramic mass formed of flat tile which are held in a stable position, with each tile locked to the mating tile so that lateral and longitudinal displacement is impossible. This is important in order that the longitudinal passage formed between the tile when they are stacked will be uniform in section and no offset or shoulder will be presented by the adajacent tile.

It has been found that tile forming heat regenerative stacks are subject to cyclic temperature differences which cause the tile to tend to creep. Since the tile in such a stack are usually stacked in a channel of high temperature brick which offer lateral resistance to movement of the tile, they tend to creep lengthwise of the channel, usually toward the cool end. This is particularly true if the high temperature zone is displaced from the midpoint to heat the end section to the ignition point of any combustible deposits such as tar and carbon which sometimes accumulate when cracking petroleum gases or liquids. It is an object of this invention to provide a form of tile which is so well interlocked that it cannot creep.

Another object of this invention is to form such a regenerative mass from tile which are formed of a material selected from the group which includes silicon carbide and aluminum oxide. These materials have a relatively high heat storage and heat conductive capacity and they are quite heat refractory; that is, they can be subjected to temperatures in the neighborhood of 3000° F. for long periods without injury. Other materials may be used, the important factors being specific heat, heat conductivity, coefficient of expansion, and resistance to high temperature with either oxidizing or reducing atmospheres. Refractories such as magnesium oxide, zirconium oxide, or high temperature porcelain may be used.

It is a further object of the invention to form such a mass from relatively thin tile which are piled with their contacting surfaces horizontal, the mass having parallel channels extending longitudinally through the mass parallel to the edges of said tile.

It is a further object of the invention to form such a mass from tile having centrally located indentations in one surface thereof paralleling channels in the opposite surface and having projections on the opposite surface paralleling the channels adjacent the ends thereof and mating with the indentations on superposed tile.

It is a further object of the invention to provide in such a mass portions which form continuous solid vertical columns braced against each other by continuous members extending horizontally at right angles to said columns.

Further objects and advantages will be made evident hereinafter.

Referring to the drawings, which are for illustrative purposes only:

Fig. I is a section through a furnace having a heat regenerative mass embodying the invention claimed herein;

Fig. II is a perspective view of a portion of one of the tile embodying said invention;

Fig. III is a perspective view similar to that of Fig. II with the tile inverted;

Fig. IV is a section through a portion of a mass constructed of the tile embodying the invention;

Fig. V is a section of a portion of the mass shown in Fig. IV; and

Fig. VI is a reduced section taken along the line 21—21 of Fig. V.

Each of the tile used in the heat regenerative mass, a portion of such a tile being shown in Figs. II and III, has a flat back 2 with a series of dents 3 equally spaced and parallel to each other and to the sides of the tile. The dents 3 extend across the middle half of the length of a tile, as shown in Fig. III. Ordinarily the tile are laid horizontally in the mass, the backs 2 being at the bottom. The top or face of each tile has a series of tongues 5 which form a groove 6. The tongues 5 have caps 7 which are so situated as to register in the dents 3 as the tile are piled up to form the mass. Each of the caps 7 extends for only a portion of the length of its adjacent grooves. There may be a number of tile in each layer and a number of layers in each mass. Each of the grooves 6 is closed by the back of the tile in the next higher layer, the grooves and backs thus forming closed channels 8.

As seen in Fig. VI, the tile are stacked with one layer offset longitudinally from superposed and underlying layers so that the engagement of the caps 7 of two adjacent tile with the dents 3 of the superposed tile produces an interlocked structure which maintains the tongues in alignment and prevents creeping of the tile in one layer relative to tile in the superposed and underlying layers.

The regenerative mass 11 as shown in Fig. I includes a heat insulating lining 12 around the mass 11 and inside a steel shell 13. The shell 13 may consist of a metal trough 14 having a bolted cover 15.

Any ceramic material now available has a high compressive strength but is easily fractured. The height 16 of the mass 11 as shown in Fig. I may be several feet and since the material of which the tile are made has a specific gravity of perhaps 2.5, the weight of the mass 11 is quite substantial. It is necessary that a special form of tile be used, especially since portions of the tile are heated in use to a bright heat perhaps in excess of 3000° F.

The tongues 5 in the mass are aligned along a vertical plane indicated by the line 21—21 of Figs. IV and V, thus forming a continuous wall 22, extending longitudi-

I claim as my invention:

1. A tile formed of a heat refractory material, said tile being characterized by: a flat back having a series of dents therein which are equally spaced and parallel with each other and with the sides of the tile, said dents having a length extending only a portion of the length of the tile; and a series of caps on the face of the tile and parallel to each other and with the sides of the tile, and with said dents being so formed and placed as to fit neatly in the dents on an adjacent tile.

2. A tile formed of heat refractory material and comprising: a series of tongues parallel to each other and extending longitudinally of the top of the tile and forming grooves of uniform cross section, the grooves extending over the entire length of the tile between said tongues; and a series of caps, each extending outwardly from one of said tongues, and each of said caps extending for only a portion of the length of its adjacent groove, there being dents in the bottom of said tile into which a cap from the underlying tile can fit freely, each of said dents being centrally located under one of said tongues, said tongues, dents, and grooves being parallel.

3. In a tile, the combination of: a tongue projecting upwardly from the upper surface of said tile; and a cap formed on the upper surface of said tongue, said tile having a dent on the lower surface centrally located with reference to said tongue and of such size and shape as to receive a tongue of an underlying tile, said tongue and dent being parallel.

4. A heat regenerative mass composed of a multiplicity of tile, each of which is laid horizontally to form a mass having flat sides which are parallel to each other, each of said tile having a series of tongues projecting upwardly from the top thereof separated from each other by open grooves, these grooves being of substantially uniform cross section, and parallel with all the other grooves and the sides of the mass, each of said tile having a flat horizontal bottom closing the open top of a lower tile, and each of said tile having a plurality of dents in the bottom thereof, each dent being centrally located with relation to a tongue on the top of said tile and so placed as to readily receive the top of a tongue on the top of a lower tile, said tongues, dents, and grooves being parallel.

5. A tile having a series of grooves on the face thereof formed by tongues between said grooves, said grooves being parallel to each other and equally spaced across the tile, said tongues and grooves extending longitudinally throughout the length of the tile, the end portions of said tongues having caps extending therefrom, said tile having shallow dents on the back thereof, said dents being parallel to said tongues and equally spaced across the tile, said dents being centrally located with relation to the length of said tile, each dent being aligned with one of said caps.

6. A heat regenerative mass formed of a plurality of layers of tile as defined in claim 5, the back of each of said tile being substantially horizontal, the tongues being so placed that they form continuous vertical walls between which the grooves in said tile extend and the caps of adjacent tile engage the dents in the superposed tile.

References Cited in the file of this patent

UNITED STATES PATENTS

| | | |
|---|---|---|
| 1,341,970 | Chantraine | June 1, 1920 |
| 2,108,871 | Smalley | Feb. 22, 1938 |
| 2,622,864 | Hasche | Dec. 23, 1952 |
| 2,644,327 | Clements | July 7, 1953 |
| 2,706,109 | Odman | Apr. 12, 1955 |